T. C. PURCELL.
PEDAL CONTROL FOR MOTOR VEHICLES.
APPLICATION FILED MAR. 26, 1919.
1,314,210.
Patented Aug. 26, 1919.
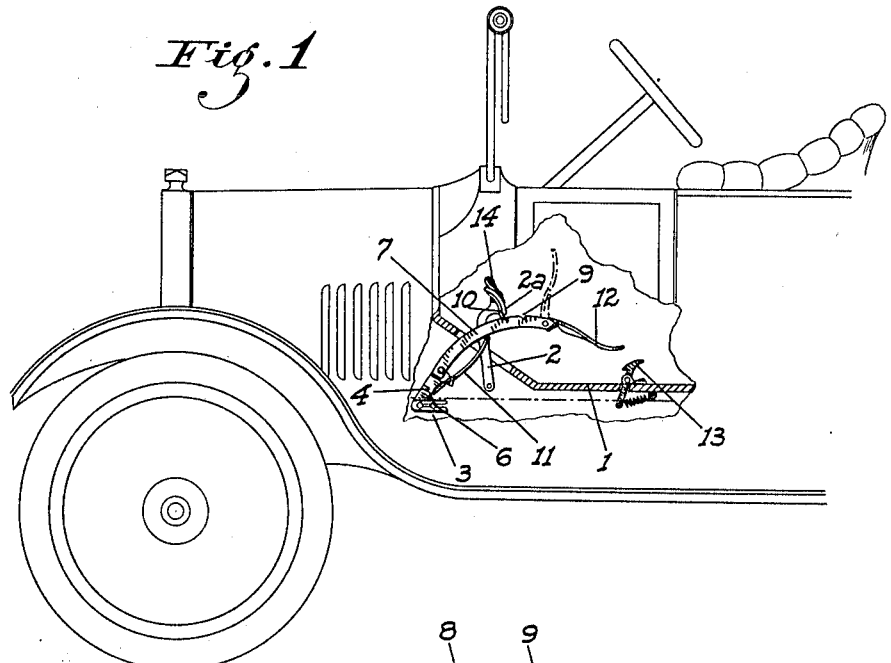
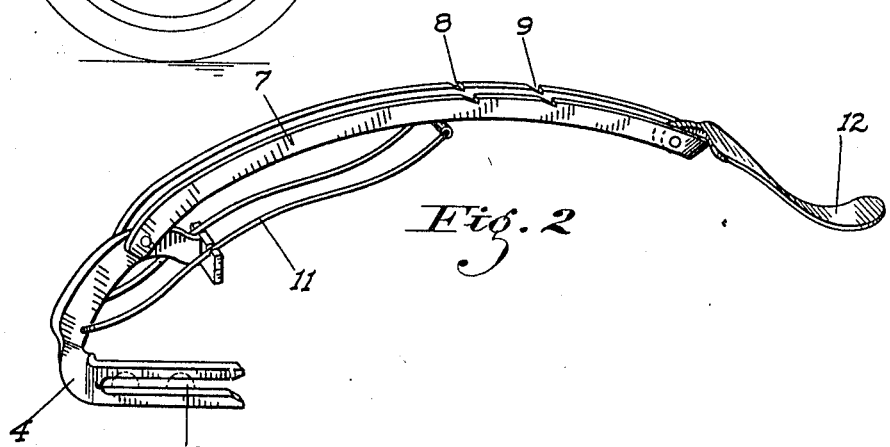
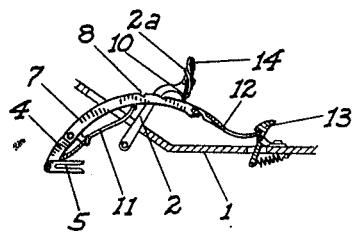
INVENTOR
Thomas C. Purcell
BY
ATTORNEY

UNITED STATES PATENT OFFICE.

THOMAS C. PURCELL, OF CHINESE CAMP, CALIFORNIA, ASSIGNOR OF ONE-HALF TO SAUL MORRIS, OF CHINESE CAMP, CALIFORNIA.

PEDAL CONTROL FOR MOTOR-VEHICLES.

1,314,210.   Specification of Letters Patent.   Patented Aug. 26, 1919.

Application filed March 26, 1919. Serial No. 285,239.

*To all whom it may concern:*

Be it known that I, THOMAS C. PURCELL, a citizen of the United States of America, residing at Chinese Camp, in the county of Tuolumne, State of California, have invented certain new and useful Improvements in Pedal Controls for Motor-Vehicles; and I do declare the following to be a clear, full, and exact description of the same, reference being had to the accompanying drawings, and to the characters of reference marked thereon, which form a part of this application.

This invention relates to improvements in pedal control means for motor vehicles, particularly of the Ford type, in which the low gear position is had by means of pressing the clutch pedal forward and holding it there.

This is a feature of great disadvantage when climbing a long grade, in which event the driver must keep his foot on the pedal and maintain the forward pressure thereagainst as long as it is necessary to keep the car in low gear.

The principal object of my invention is to eliminate the necessity of this continuous foot pressure by means of an easily and instantly operable device for holding the clutch pedal in either the low or neutral positions, while allowing free movement of the same to the high gear position when so desired.

A further object of the invention is to provide a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a partial side elevation of a Ford type of automobile partly broken away to show my improved form of pedal control, showing the clutch pedal locked in low gear.

Fig. 2 is a perspective view of the control quadrant.

Fig. 3 is a fragmentary view, showing the pedal in high gear position.

Referring now more particularly to the characters of reference on the drawings, the numeral 1 designates the floor board of the vehicle, of the type named, through which projects the usual clutch pedal 2 having a foot-rest portion $2^a$ thereon. Secured to the side frame of the vehicle, as at 3, is a clamp and bearing member 4 having a longitudinal slot 5 therein through which the holding bolts 6 pass and by means of which the longitudinal position of the clamp may be adjusted.

Pivotally mounted to the clamp is a quadrant 7 adapted to straddle the pedal 2 below the foot rest portion $2^a$.

This quadrant is provided with a pair of spaced notches 8 and 9 thereon, and the portion $2^a$ of the pedal is provided with a pawl member 10 rigidly secured thereto, adapted to engage with the notches 8 and 9, the notch 8 being the low gear position and the notch 9 the neutral position of the pedal 2.

A spring 11 mounted to the clamp 3 and bearing against the under side of the quadrant 7 exerts a tendency to raise the quadrant and normally holds the same in contact with the pawl 10 on the pedal.

Pivotally mounted to the outer end of the quadrant for upward movement relative thereto is a foot plate 12, the outer end of which is adapted to catch on a vertical spring pulled dog 13 pivotally mounted to the floor 1 when the quadrant 7 is pressed down away from contact with the pedal pawl 10.

The member 12 being pivoted to the quadrant 7 for upward movement allows the same to assume the position indicated in dotted lines in Fig. 1, which position permits of the easy removal of the floor board 1 when necessary.

If desired, an additional foot-press member 14 may be attached on top of the pedal member $2^a$ and held thereto by the same means as used for the pawl 10.

In operation, supposing the gears to be in neutral position, the pawl 10 will be in contact with the notch 9. When starting the car, or climbing a grade, the pedal is pressed forward until the pawl 10 engages the low-gear notch 8, which position it will retain indefinitely until intentionally released, owing to the spring-pressed quadrant. When it is desired to run in high, however, the foot member 12 is pressed down until it engages with the dog 13, when the pedal 2 will fly back into its high gear position of its own accord, such being the construction of this type of transmission.

When it is again desired to engage the quadrant with the pedal, the foot is drawn back over the top of the dog 13, which releases the quadrant and the same will fly upward for the reason before stated.

From the foregoing description, it will readily be seen that I have produced such a device as substantially fulfils the objects of the invention, as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:—

In combination with a motor vehicle having a change speed transmission operable by the clutch pedal, a spring pressed quadrant pivotally mounted to the frame of the vehicle and adapted to straddle the shank of the pedal, a pawl on the pedal adapted to engage low or neutral position notches cut in the quadrant, the latter being normally in contact with the pawl whereby the pedal is held in locked position relative to the quadrant and means whereby the quadrant may be released from contact with the pawl and so held, such means including a spring pulled dog mounted to the floor of the vehicle, and a foot plate on the quadrant, the edge of the plate being adapted to catch under the dog when the quadrant is pressed down away from contact with the pawl on the pedal.

In testimony whereof I affix my signature in presence of two witnesses.

THOMAS C. PURCELL.

Witnesses:
   VERADINE WARNER,
   VIVIAN MORRIS.

Copies of this patent may be obtained for five cents each, by addressing the "Commissioner of Patents, Washington, D. C."